United States Patent [19]

Akao et al.

[11] Patent Number: 5,247,521
[45] Date of Patent: Sep. 21, 1993

[54] DATA PROCESSOR

[75] Inventors: Yasushi Akao, Ithaca, N.Y.; Shinkichi Hotta, HigashiYamato, Japan; Haruo Keida, Tokorozawa, Japan

[73] Assignee: Hitachi, Ltd., Tokyo, Japan

[21] Appl. No.: 848,547

[22] Filed: Mar. 9, 1992

Related U.S. Application Data

[63] Continuation of Ser. No. 584,608, Sep. 19, 1990, Pat. No. 5,142,536, which is a continuation of Ser. No. 39,695, Apr. 20, 1987, Pat. No. 4,989,208.

[30] Foreign Application Priority Data

Apr. 23, 1986 [JP] Japan ................ 61-92031

[51] Int. Cl.$^5$ .................................. G06F 11/00
[52] U.S. Cl. ........................ 371/16.1; 371/18.1; 371/22.1
[58] Field of Search ............... 371/16.1, 18.1, 15.1, 371/16.4, 22.1, 22.3, 25.1; 324/73; 395/575 MS File

[56] References Cited

U.S. PATENT DOCUMENTS

| | | | |
|---|---|---|---|
| 4,455,620 | 6/1984 | Watanabe et al. | 364/900 |
| 4,604,746 | 8/1986 | Blum | 371/22.3 |
| 4,701,721 | 10/1987 | Powell et al. | 371/22.3 |
| 4,710,931 | 12/1987 | Bellay et al. | 371/22.3 |
| 4,967,387 | 10/1990 | Shibasaki et al. | 371/16.1 |
| 5,109,383 | 4/1992 | Chujo | 371/22.3 |

OTHER PUBLICATIONS

Otmar Feger "Ein-Chip-Mikrocomputer-Handbuch", Verlag Markt & Technik, 17.06.92; pp. 115-120.

*Primary Examiner*—Robert W. Beausoliel, Jr.
*Assistant Examiner*—Phung My Chung
*Attorney, Agent, or Firm*—Fay, Sharpe, Beall, Fagan, Minnich & McKee

[57] ABSTRACT

In a single chip microcomputer, functional blocks such as the central processing unit (CPU), the ROM for storing programs, the RAM for storing the data and the I/O circuit for the input and the output of the data and the like are formed on one semiconductor substrate. Address data is used for selecting predetermined areas of the functional blocks in the internal bus to which the address data must be supplied by the CPU. A buffer circuit is capable of being supplied with address data from the external devices and is provided in the microcomputer. When the functional blocks are tested, address data is directly supplied to the functional blocks from the external tester without using the instruction execution of the CPU, and necessary data is outputted from the area of the predetermined functional block, passing through the buffer circuit and is read out directly to the external devices. Hence, the testing efficiency is improved.

27 Claims, 2 Drawing Sheets

IB-INTERNAL BUS
MCU-SINGLE CHIP MICROCOMPUTER

IB-INTERNAL BUS
MCU-SINGLE CHIP
    MICROCOMPUTER

DATA PROCESSOR

This is a continuation of application Ser. No. 07/584,608, filed Sep. 19, 1990 now U.S. Pat. No. 5,142,536; which is a continuation of application Ser. No. 07/039,695, filed Apr. 20, 1987, which is now U.S. Pat. No. 4,989,208, issued Jan. 29, 1991.

BACKGROUND OF THE INVENTION

The present invention generally relates to data processors, and more particularly to a data processor which is useful for a single chip microcomputer, for example.

Generally, a processor portion is only integrated and formed on one semiconductor substrate in a general purpose multichip microprocessor. As described in pages 540 to 541 of "LSI HANDBOOK" published by OHM Corp. on Nov. 30th in 1984, a central processing unit, as a center part, a read only memory (ROM) for storing programs, a random access memory (RAM) for storing data and an I/O circuit for input and output of data and other functional blocks are formed on one semiconductor substrate. When a system is constituted by using the single chip microcomputer, the number of wires can be largely reduced as compared with the case where the system is constituted by using the general purpose multichip microprocessor. However, since an internal bus is also formed on the one common semiconductor substrate in the single chip microcomputer, the functional blocks are limited in use and it is not possible to freely perform a direct access to the functional blocks from external devices.

In the case where it is not possible to freely use the internal bus of the single chip microcomputer from the external devices and testing is performed on the single chip microcomputer, it is impossible to perform a direct access and testing on the functional blocks in the single chip microcomputer from the external devices. Hence, in order to perform the testing on the functional blocks, it is necessary to use an instruction execution of the central processing unit (CPU) contained in the single chip microcomputer and a time for processing steps therefor must be required. In-circuit testing is described, for example, in prior U.S. Pat. No. 4,555,783; the electrical components are tested under computer program control. Therefore, there is a problem in that the efficiency for testing on the functional blocks should become lower for a prior art single chip microcomputer than for a prior art multichip microcomputer.

Accordingly, it is a general object of the present invention to provide a data processor in which the testing efficiency on the functional blocks can be improved.

This and other objects and novel features will become apparent from the following detailed description made in connection with the accompanying drawings.

SUMMARY OF THE INVENTION

In the inventions disclosed in the present specification, a summary of the representative invention can be briefly described as follows.

The present invention relates to a data processor which provides a buffer circuit, which is enabled to be supplied from the external devices with address data for selecting predetermined areas of the functional blocks.

By using the above described means in which the address data is directly supplied to the functional blocks from a tester for the data processor and the data required for the external devices is read out directly from the predetermined area of the functional blocks via the buffer circuit, the testing efficiency of the functional blocks contained in the data processor can be improved.

DETAILED DESCRIPTION OF THE INVENTION

Figure 1:
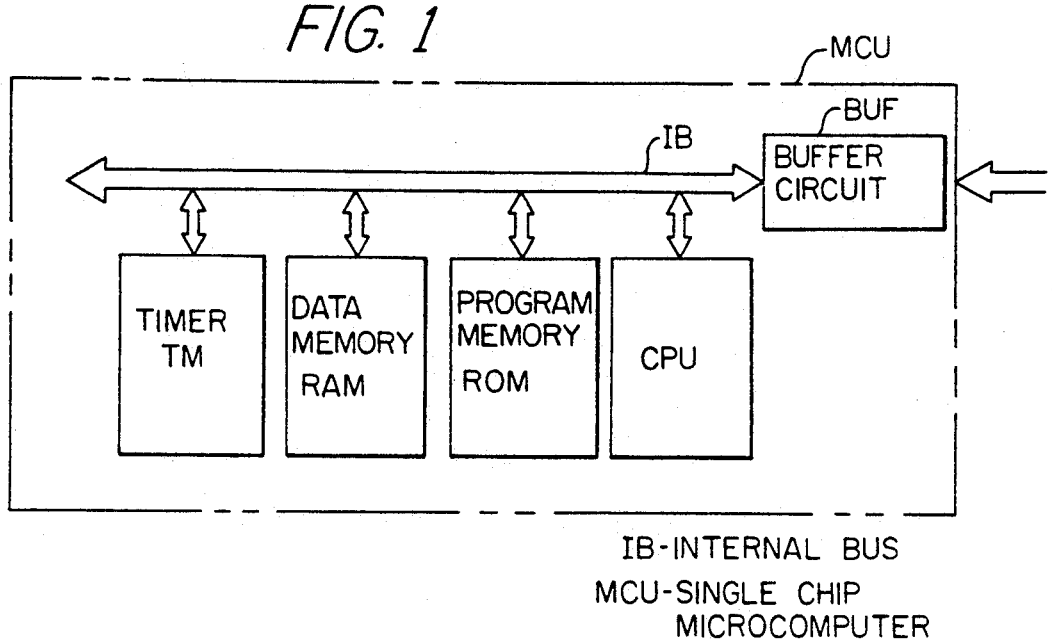
FIG. 1 is a system block diagram of the single chip microcomputer which is an embodiment of the data processor according to the present invention.

FIG. 1 is a system block diagram of the single chip microcomputer which is an embodiment of the data processor according to the present invention. The single chip microcomputer shown in FIG. 1 is formed on one semiconductor substrate in accordance with the known manufacturing techniques of the semiconductor integrated circuit.

In the single chip microcomputer MCU, the functional blocks, such as the central processing unit (CPU), a program memory ROM for storing programs, a data memory RAM in which the data is stored reloadably and a timer TM and the like, are connected to the CPU respectively via an internal bus IB which is used as an I/O circuit, and the internal bus IB can be connected to the external devices such as peripheral devices and the like via a buffer circuit BUF.

The detailed structure of the CPU is not shown in the drawing. However, when the microprogram system is employed, the CPU is composed of a program counter which indicates the address of the instruction for execution, an instruction register in which the instruction read out from the program memory ROM is stored based on the output signal of the program counter, a decoder which decodes the instruction from the instruction register and an execution portion which executes the instruction based on the control signal outputted from the decoder.

Figure 2:
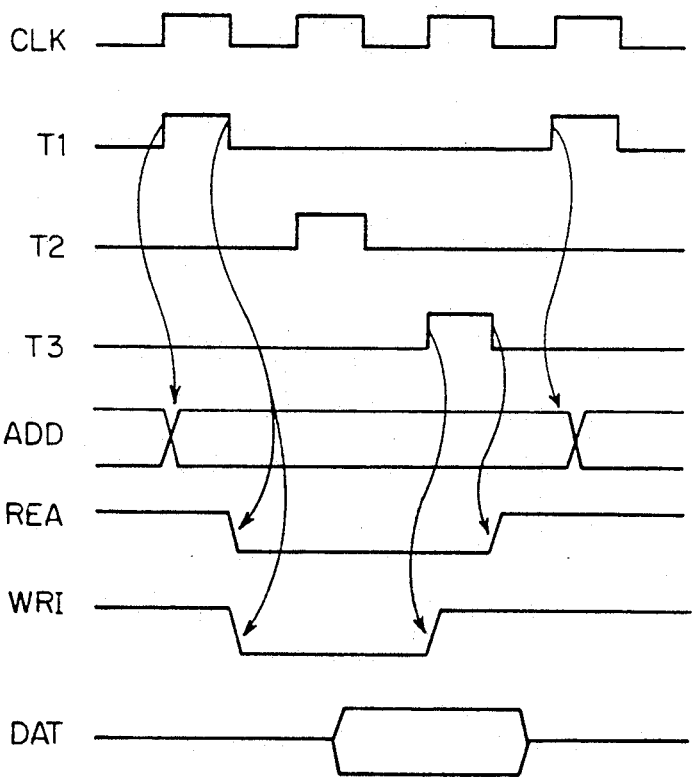
FIG. 2 is a time chart showing input and output timing of signals in the case where the internal bus is used as the standard bus.

The internal bus IB is composed of a predetermined number of data bus(s), address bus(s) and control bus(s). The internal bus IB has a characteristic as the standard bus in which a usage reference is predetermined. According to the predetermined usage reference, a plurality of timing signals are sequentially generated based on a system clock signal which has a frequency with respect to an oscillator frequency of a crystal oscillator (not shown in the drawing) and the like externally coupled to the single chip microcomputer MCU or a system clock signal supplied from the external devices, and the address signal, the data and the control signal are supplied in accordance with the timing signals. For example, as shown in FIG. 2, in the case where three kinds of timing signals T1 to T3 are used with respect to the system clock signal CLK, timing is set so that the predetermined address signal ADD is supplied to the address bus in one cycle period of the timing signal T1 and data DAT is supplied to the data bus with set-up times and hold times which are predetermined based on leading edge timing of the timing signal T3. A read control signal REA is supplied to the control bus in the period between the trailing edges of the timing signal T1 and the trailing edges of the timing signal T3. In addition, a write control signal WRI is supplied to the control bus in the period between the trailing edges of the timing signal T1 and the leading edges of the timing signal T3. Thus, when the standard bus system is employed for the internal bus IB, a timing management becomes extremely simple in the timing between the external devices (not shown in the drawing) and the single chip microcomputer MCU. The timing management also becomes extremely simple in the internal portion of the single chip microcomputer MCU.

In this case, the buffer circuit BUF has the normal constitution with respect to the relationship between the buffer circuit BUF and the external devices which has a system constitution to be controlled by the single chip microcomputer MCU. In other words, the address signal supplied from the CPU is outputted via the address bus in the internal bus IB in order to select the external devices (not shown in the drawing) and a Read/Write control signal for the external devices is outputted via the control bus therein. In this case, I/O operations for the data bus are alternatively switched and controlled in response to Read/Write operations of the CPU so that the data bus becomes capable of inputting the data supplied from the external devices when the CPU must read the data from the external devices and the data bus becomes capable of outputting the data supplied from the CPU when the CPU must write the data to the external devices.

Especially in the buffer circuit BUF, since the functional blocks become capable of performing the direct access by the use of an external tester (not shown in the drawing) when the testing is carried out on the functional blocks except the CPU contained in the single chip microcomputer MCU, input and output of signals are controlled in inverted modes of the control modes described above in a test mode. In other words, the address bus and the control bus become capable of inputting the address signal and the control signal supplied from the tester when the test mode is instructed by the test signal supplied from the external tester. In addition, the data which is supplied to the data bus can be outputted to the external devices when the read control signal is inputted as the control signal. Furthermore, the data which is supplied from the external devices can be inputted to the data bus when the write control signal is inputted as the control signal.

Figure 3:
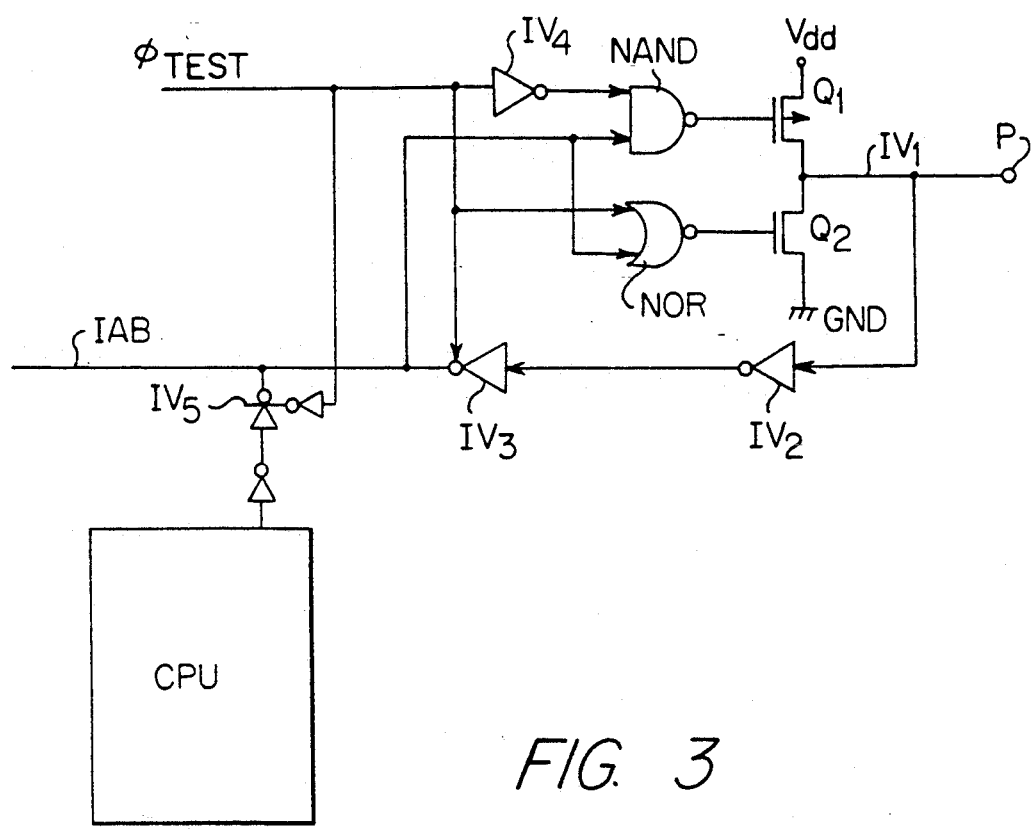
FIG. 3 is a system circuit diagram showing a concrete example of a control portion which controls input and output directions of an address signal in the buffer circuit.

In the buffer circuit BUF, a concrete constitution of the control portion which controls the input and output directions of the address signal is shown in FIG. 3 though it is not limited to any specific constitution. In other words, the buffer circuit BUF has a CMOS inverter circuit IV1 which is composed of a p-channel MOSFET Q1 and a n-channel MOSFET Q2 as a final output portion, and an output terminal thereof is connected to an external terminal P. The external terminal P is connected to an input terminal of an inverter circuit IV2 and is also connected to an address bus IAB via a clocked inverter circuit IV3 which is connected to the inverter circuit IV2 in series and a test signal $\phi$ test is applied to a control terminal thereof. The gate of the MOSFET Q1 is coupled to the output terminal of a double input type NAND gate circuit NAND, and the gate of the MOSFET Q2 is coupled to the output terminal of a double input type NOR gate circuit NOR. In the NAND gate circuit NAND, an input terminal thereof is coupled to an address bus IAB and another input terminal thereof is supplied with the test signal $\phi$ test via an inverter circuit IV4. In the NOR gate circuit NOR, an input terminal thereof is coupled to the address bus IAB and another input terminal thereof is supplied with the test signal $\phi$ test. The address bus IAB is coupled to address signal input terminals of the functional blocks including the timer TM, the data memory RAM and the program memory ROM and the like other than the CPU. Furthermore, an address signal output terminal of the CPU is coupled to the address bus IAB via a clocked inverter circuit IV5 in which the inverted signal of the test signal $\phi$ test is supplied to the control terminal thereof.

The test signal $\phi$ test is supplied from the tester (not shown in the drawing) and is supplied to the single chip microcomputer MCU via test pins, and the test mode is instructed when the level of the test signal $\phi$ test becomes the high level.

When the single chip microcomputer MCU is applied to a certain predetermined system and controls the certain system, the signal from the tester is not supplied to the test pins and the test signal $\phi$ test becomes of the low level. When the test signal $\phi$ test becomes of the low level, the impedance of the clocked inverter circuit IV3 becomes of a higher value, and thereby the address bus IAB becomes incapable of inputting the address signal via the external terminal P. In addition, when the test signal $\phi$ test becomes of the low level, the NAND gate circuit NAND and the NOR gate circuit NOR become capable of outputting signals in response to the level of the address signal which is supplied to the address bus IAB from the CPU. At that time, the address signal is outputted from the CPU and the buffer circuit BUF becomes capable of supplying the address signal to the external devices (not shown in the drawing) via the external terminal P.

On the other hand, when the test signal $\phi$ test becomes of the high level, the levels of the output signals of the NAND gate circuit NAND and the NOR gate circuit NOR are fixed so that the impedance of the CMOS inverter circuit IV1 becomes of a higher value, regardless of the level of the signal supplied from the address bus IAB. In addition, the clocked inverter circuit IV3 becomes capable of outputting signals in response to the level of the signal which is supplied to the external terminal. Therefore, the operation of the buffer circuit in the test mode becomes reverse to that of the normal control mode, and the address signal applied to the external terminal P can be supplied to the address bus IAB. In the buffer circuit BUF, the control portion which controls the input and the output directions of the control signal and another control portion which controls the input and output directions of the data can be constituted based on FIG. 3.

Next, description will be given with respect to the embodiments.

In the case where the test is performed on the functional blocks contained in the single chip microcomputer MCU, such as the program memory ROM, the data memory RAM and the timer TM and the like, the buffer circuit BUF of the single chip microcomputer MCU is connected to the output terminal of the tester (not shown in the drawing). The tester includes a central processing unit for the test (not shown in the drawing) which controls test operations. A reference clock signal of the central processing unit for the test is supplied to the single chip microcomputer according to the present embodiment and is used as the system clock signal of the single chip micro-computer MCU.

First, when the test signal φ test which is supplied to the single chip microcomputer MCU from the tester (not shown in the drawing) becomes of the high level and the test mode is instructed, the buffer circuit BUF sets the input and output directions of the signals so that the central processing unit for the test (not shown in the drawing) contained in the tester can perform the direct access to the functional blocks contained in the single chip microcomputer MCU. In other words, the address bus and the control bus in the single chip microcomputer MCU become capable of inputting the address signal and the control signal respectively which are outputted from the tester. In this case, the data on the data bus becomes capable of being outputted to the external devices when the read control signal is supplied from the central processing unit for the test. Again in this case, the data supplied from the external devices becomes capable of being inputted to the data bus when the write control signal is supplied from the central processing unit for the test. Therefore, the address signal outputted from the central processing unit for the test is supplied to the internal bus IB via the buffer circuit BUF, and the predetermined area of the functional block which must be tested is selected by the address signal. In this case, when the read control signal is supplied to the functional block from the central processing unit for the test, the data is read out from the area and is passed through the buffer circuit BUF so as to be supplied to the central processing unit for the test wherein the data is subjected to a test processing. In addition, when the predetermined area of the functional block such as the data memory RAM wherein the data is stored reloadably is selected and the write signal is supplied to that functional block from the central processing unit for the test, the data outputted from the central processing unit for the test is passed through the buffer circuit BUF and is written in the area of the functional block wherein the data stored in the functional block is corrected. It is also possible to test the corrected data under the read control signal as described above.

Thus, when the test mode is set, the input and output directions of the signals in the buffer circuit BUF are set to be reverse to the ones in the normal operation. For this reason, the central processing unit for the test can perform direct accesses respectively to the functional blocks contained in the single chip microcomputer MCU as if the functional blocks were peripheral devices.

The internal bus IB of the single chip microcomputer MCU according to the present embodiment employs the usage system as the standard bus as described in FIG. 2. For this reason, when the central processing unit for the test supplies the address signal and the control signal to the single chip microcomputer MCU in response to the timing as shown in FIG. 2, it becomes certainly possible to perform the read operation and the write operation with respect to the functional blocks. Especially, when the specification of the internal bus is set identical to that of the standard bus, it becomes possible to standardize operation timing including timing of the test operation of the single chip microcomputer even if the CPU and other functional blocks which constitute the single chip microcomputer are changed respectively. Therefore, in any single chip microcomputers which are designed with custom IC but of which specifications are set identical to that of the standard bus, it is possible to perform testing on any kinds of the single chip microcomputers by the use of testers of which test timing is basically the same.

According to the embodiment described heretofore, the effects can be obtained as follows:

(1) When the test mode is set, the input and output directions of the signals in the buffer circuit BUF are set to be reverse to the ones in the normal control operation. For this reason, the central processing unit for the test can perform direct accesses respectively to the functional blocks as if the functional blocks were peripheral devices. Hence, it is not necessary to execute the instruction in the CPU contained in the single chip microcomputer supplied from the external devices and to perform the Read/Write operations in the functional blocks as in the case where it is not possible to perform direct access to the functional blocks from the external devices.

(2) According to the above-mentioned effect, the testing efficiency of the functional blocks in the single chip microcomputer can be improved.

(3) When the used timing of the internal bus in the single chip microcomputer is set identical to that of the standard bus, it becomes possible to standardize the operation timing including the timing of the test operation of the single chip microcomputer even if the CPU and other functional blocks which constitute the single chip microcomputer are changed respectively.

(4) According to the effect (3), in any single chip microcomputers which are designed with custom IC but of which specifications are set identical to that of the standard bus, it becomes possible to perform testing on any kinds of the single chip microcomputers by the use of testers of which test timing is basically the same.

(5) According to the effects (2) and (4), it is possible to obtain a synergetic effect in that the testing can be performed easily in the single chip microcomputer.

Hereinbefore, a concrete description has been given with respect to the present invention. However, the preferred embodiment described herein is illustrative and not restrictive. Therefore, it is apparent that other embodiments and modifications of the invention are possible within the scope of the invention and without departing from the spirit or essential characteristics thereof.

For example, the central processing unit contained in the single chip microcomputer employs the microprogram system in the present embodiment. However, it is not restrictive and it is possible to change the microprogram system to a wired logic system. In addition, the concrete constitution of the buffer circuit as an I/O circuit is not limited to the one in the present embodiment and any modification can be applied to the buffer circuit.

Heretofore, description has been given with respect to the case where the invention made by the inventors is applied to the single chip microcomputer which is described in the foregoing items on the background and the field of the invention. However, it is not restrictive and the present invention can be also applied to other data processors. Hence, the present invention can be applied to a data processor which has the internal bus at least.

Hereinafter, a simple description will be given with respect to the effects obtained by the representative invention disclosed in the present specification.

The buffer circuit is provided in order to supply address data fed from the external devices, wherein the predetermined area of the functional blocks is selected in the internal bus using the address data and the address data is to be supplied to the internal bus by the central processing unit. In the test mode, the input and output directions of the signals of the buffer circuit BUF are set to be reverse to the ones in the normal control operation, and the tester can make direct access to the functional blocks contained in the single chip microcomputer respectively as if the functional blocks were peripheral devices. Accordingly, the testing efficiency of the functional blocks contained in the data processor can be improved.

We claim:

1. An integrated data processor comprising:
   an internal bus having an address bus, a data bus and a control bus;
   an external terminal means;
   a central processing unit having an output;
   a plurality of function blocks coupled to the internal bus, one of said function blocks being a memory;
   a buffer circuit connected between said external terminal means and said central processing unit;
   mode means providing a first operating mode in which the central processing unit provides a first address signal and a first control signal onto the address bus and the control bus, respectively, in accordance with a predetermined first supply timing, and a second operating mode in which the plurality of function blocks are accessed from outside of the data processor;
   coupling means between the output of the central processing unit and the internal bus for coupling the output of the central processing unit to the internal bus when the data processor is in the first operating mode, and for uncoupling the output of the central processing unit from the internal bus when the data processor is in the second operating mode;
   the buffer circuit including output means for providing the first address signal and the first control signal from the internal bus to the external terminal means at the predetermined first supply timing when the data processor is in the first operating mode, and input means for providing a second address signal and a second control signal supplied from outside of the data processor directly to the function flocks via the internal bus, not by the central processing unit, at a predetermined second supply timing when the data processor is in the second operating mode; and
   wherein the predetermined second supply timing of the second address signal and second control signal to the internal bus in the second operating mode is substantially identical with the predetermined first supply timing of the first address signal and first control signal to the internal bus in the first operating mode.

2. The data processor of claim 1, wherein another of the function blocks is a timer, and wherein the memory includes a random access memory for storing data therein and a read only memory for storing program data therein.

3. The data processor of claim 2, wherein the buffer circuit further includes a data input/output circuit controlling input and output directions of data between the internal bus and the external terminal means in response to one of the first control signal and the second control signal.

4. The data processor of claim 3, wherein said external terminal means includes a first external terminal as means for receiving a test signal, wherein said mode means is responsive to the test signal and selectively provides one of the first operating mode and the second operating mode, and wherein the second operating mode includes a testing mode.

5. The data processor of claim 2, wherein the coupling means includes a clocked inverter circuit.

6. The data processor of claim 2, wherein said external terminal means includes a first external terminal as means for receiving a test signal, wherein said mode means is responsive to the test signal and selectively provides one of the first operating mode and the second operating mode, and wherein the second operating mode includes a testing mode.

7. The data processor of claim 6, further including:
   a first supply voltage terminal;
   a second supply voltage terminal;
   wherein the external terminal means includes a second external terminal; and
   wherein said buffer circuit includes a p-channel MOSFET having a source-drain path coupled between the first supply voltage terminal and the second external terminal, and a gate,
   an n-channel MOSFET having a source-drain path coupled between the second supply voltage terminal and the second external terminal, and a gate,
   a first inverter circuit having an input coupled to the second external terminal and a first inverter output,
   a clocked inverter circuit having a control terminal coupled to receive the test signal, an input coupled to the output of the first inverter circuit, and an output coupled to the address bus,
   a second inverter circuit having an input coupled to receive the test signal and an output,
   a double input type NAND circuit having an output coupled to the gate of the p-channel MOSFET and two inputs, one of which is coupled to the address bus and the other of which is coupled to the output of the second inverter circuit, and
   a double input type NOR circuit having an output coupled to the gate of the n-channel MOSFET and two inputs, one of which is coupled to the address bus, and the other input of which is coupled to receive the test signal.

8. The data processor of claim 7, further including a third inverter circuit coupled to receive the test signal and output an inverted test signal, and wherein the coupling means includes a second clocked inverter circuit having a control terminal coupled to receive the inverted test signal from the third inverter circuit, and wherein the second clocked inverter is electrically coupled between the output of the central processing unit and the address bus.

9. The data processor of claim 1, wherein the coupling means includes a clocked inverter circuit.

10. The data processor of claim 1, wherein the buffer circuit further includes a data input/output circuit controlling input and output directions of data between the internal bus and the external terminal means in response to one of the first control signal and the second control signal.

11. The data processor of claim 1, wherein said external terminal means includes a first external terminal as means for receiving a test signal, and wherein said mode means is responsive to the test signal and selectively provides one of the first operating mode and the second operating mode.

12. The data processor of claim 11, further including:
a first supply voltage terminal;
a second supply voltage terminal;
wherein the external terminal means includes a second external terminal; and
wherein said buffer circuit includes a p-channel MOSFET having a source-drain path coupled between the first supply voltage terminal and the second external terminal, and a gate,
an n-channel MOSFET having a source-drain path coupled between the second supply voltage terminal and the second external terminal, and a gate,
a first inverter circuit having an input coupled to the second external terminal and a first inverter output,
a clocked inverter circuit having a control terminal coupled to receive the test signal, an input coupled to the output of the first inverter circuit, and an output coupled to the address bus,
a second inverter circuit having an input coupled to receive the test signal and an output,
a double input type NAND circuit having an output coupled to the gate of the p-channel MOSFET and two inputs, one of which is coupled to the address bus and the other of which is coupled to the output of the second inverter circuit, and
a double input type NOR circuit having an output coupled to the gate of the n-channel MOSFET and two inputs, one of which is coupled to the address bus, and the other input of which is coupled to receive the test signal.

13. The data processor of claim 12, wherein said buffer circuit further includes a third inverter circuit coupled to receive the test signal and output an inverted test signal, and wherein the coupling means includes a second clocked inverter circuit having a control terminal coupled to receive the inverted test signal from the third inverter circuit, and wherein the second clocked inverter is coupled between the output of the central processing unit and the address bus.

14. The data processor of claim 12, wherein the second operating mode includes a testing mode.

15. The data processor of claim 1, wherein the second operating mode includes a testing mode.

16. In a method of operating an integrated data processor including a central processing unit, an internal bus having data, control and address buses, a plurality of function blocks coupled to the internal bus, one of the function blocks being a memory for storing data therein and a buffer circuit coupled to the internal bus, the method comprising the steps of:
operating the integrated data processor in a first operation mode in which the central processing unit provides a first address signal and a first control signal onto the address bus and the control bus, respectively, in accordance with a predetermined first supply timing;
operating the integrated data processor in a second operation mode that includes accessing the plurality of function blocks directly from the outside of the integrated data processor;
supplying an external test signal to the data processor to establish the second operation mode;
setting input and output directions of signals in the buffer circuit with respect to the address bus and the control bus, in response to the test signal during the second operation mode so that the input and output directions of the signals in the buffer circuit with respect to the address bus and the control bus in the first operation mode are reverse to those in the second operation mode;
uncoupling the central processing unit from the internal bus in response to the test signal in the second operation mode;
inputting an external second address signal that addresses an area of one of the function blocks from outside of the data processor to the function blocks via the buffer circuit and the address bus in accordance with a predetermined second supply timing, said step of inputting not being by the central processing unit in the second operation mode;
inputting a read/write control signal from the outside of the data processor to the function blocks via the buffer circuit and the control bus in accordance with the predetermined second supply timing in the second operation mode;
setting input and output directions of signals in the buffer circuit with respect to the data bus in response to the read/write control signal in the second operation mode, and performing read or write operation of one of the function blocks in response to the read/write control signal in the second operation mode; and
establishing the predetermined second supply timing of the second address signal and the read/write control signal from outside of the data processor to the internal bus in the second operation mode so that the predetermined second supply timing is substantially identical with the predetermined first supply timing of the first address signal and the first control signal from the central processing unit to the internal bus.

17. The method according to claim 16, wherein the step of setting and performing includes the step of inputting data from the outside of the data processor directly to one of the function blocks via the buffer circuit and the internal bus, not by the central processing unit, and wherein the step of inputting data is in response to the read/write control signal indicating a write mode.

18. The method according to claim 17, wherein the step of setting and performing includes the step of outputting data from one of the function blocks directly to outside of the data processor via the internal bus and the buffer circuit, and wherein the step of outputting is in response to the read/write control signal indicating a predetermined read mode, not by the central processing unit.

19. The method according to claim 18, further comprising the step of:
operating a tester externally coupled to the data processor to provide the test signal, the second address signal, and the predetermined read/write control signal.

20. The method according to claim 19, including the step of inhibiting an output of the buffer circuit in response to the test signal.

21. The method according to claim 17, further comprising the step of:
operating a tester externally coupled to the data processor to provide the test signal, the second address signal, and the read/write control signal.

22. The method according to claim 18, including the step of inhibiting an output of the buffer circuit in response to the test signal.

23. The method according to claim 16, wherein the step of setting and performing includes the step of outputting data from one of the function blocks directly to outside of the data processor via the internal bus and the buffer circuit, and wherein the step of outputting is in response to the read/write control signal indicating a predetermined read mode, not by the central processing unit.

24. The method according to claim 23, further comprising the step of:
operating a tester externally coupled to the data processor to provide the test signal, the second address signal, and the read/write control signal.

25. The method according to claim 16, further comprising the step of:
operating a tester externally coupled to the data processor to provide the test signal, the predetermined second address signal and the read/write control signal.

26. The method according to claim 25, including the step of inhibiting an output of the buffer circuit in response to the test signal.

27. The method according to claim 16, including the step of inhibiting an output of the buffer circuit in response to the test signal.

* * * * *